United States Patent
Shirakawa et al.

(10) Patent No.: US 6,652,154 B2
(45) Date of Patent: Nov. 25, 2003

(54) OPTICAL CONNECTOR

(75) Inventors: Tsuguhito Shirakawa, Shizuoka (JP);
Tohru Yamaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 155 days.

(21) Appl. No.: 09/858,550

(22) Filed: May 17, 2001

(65) Prior Publication Data

US 2001/0051023 A1 Dec. 13, 2001

(30) Foreign Application Priority Data

May 23, 2000 (JP) ........................................ 2000-151614

(51) Int. Cl.[7] .............................. G02B 6/42; G02B 6/43
(52) U.S. Cl. ............................. 385/70; 385/72; 385/78; 385/89; 385/92
(58) Field of Search ............................. 385/55–59, 67, 385/68–70, 72, 78, 89, 92–94

(56) References Cited

U.S. PATENT DOCUMENTS 5,142,597 A * 8/1992 Mulholland et al. .......... 385/56
6,210,045 B1 * 4/2001 Dean et al. ................... 385/72
6,357,931 B1 * 3/2002 Shirakawa et al. ........... 385/75

* cited by examiner

*Primary Examiner*—Hemang Sanghavi
*Assistant Examiner*—Omar Rojas
(74) *Attorney, Agent, or Firm*—Armstrong, Westerman & Hattori, LLP

(57) ABSTRACT

At least one annular wall 6 into which a ferrule 5 for an optical fiber cable 30 is adapted to be inserted is provided in the housing 4 and exposed to the exterior. A protective frame wall 7 is provided on the housing 4 so as to project higher than the annular wall 6. The frame wall 7 is so arranged as to surround the annular wall 6, and projected upwardly and downwardly from both top and bottom sides of the housing 4. A top wall 9 for mounting a ferrule locking member 10 is formed integrally with the annular wall 6, and the top wall is positioned at the same height as the frame wall 7, and continued from the frame wall. There may be arranged a pair of the annular walls in parallel in proximity to each other. A receiving trunk 53 in a mating housing 48 continued to a light converting element 55 is adapted to be inserted into the annular wall 6, and the ferrule 5 is adapted to be inserted into the receiving trunk.

3 Claims, 5 Drawing Sheets

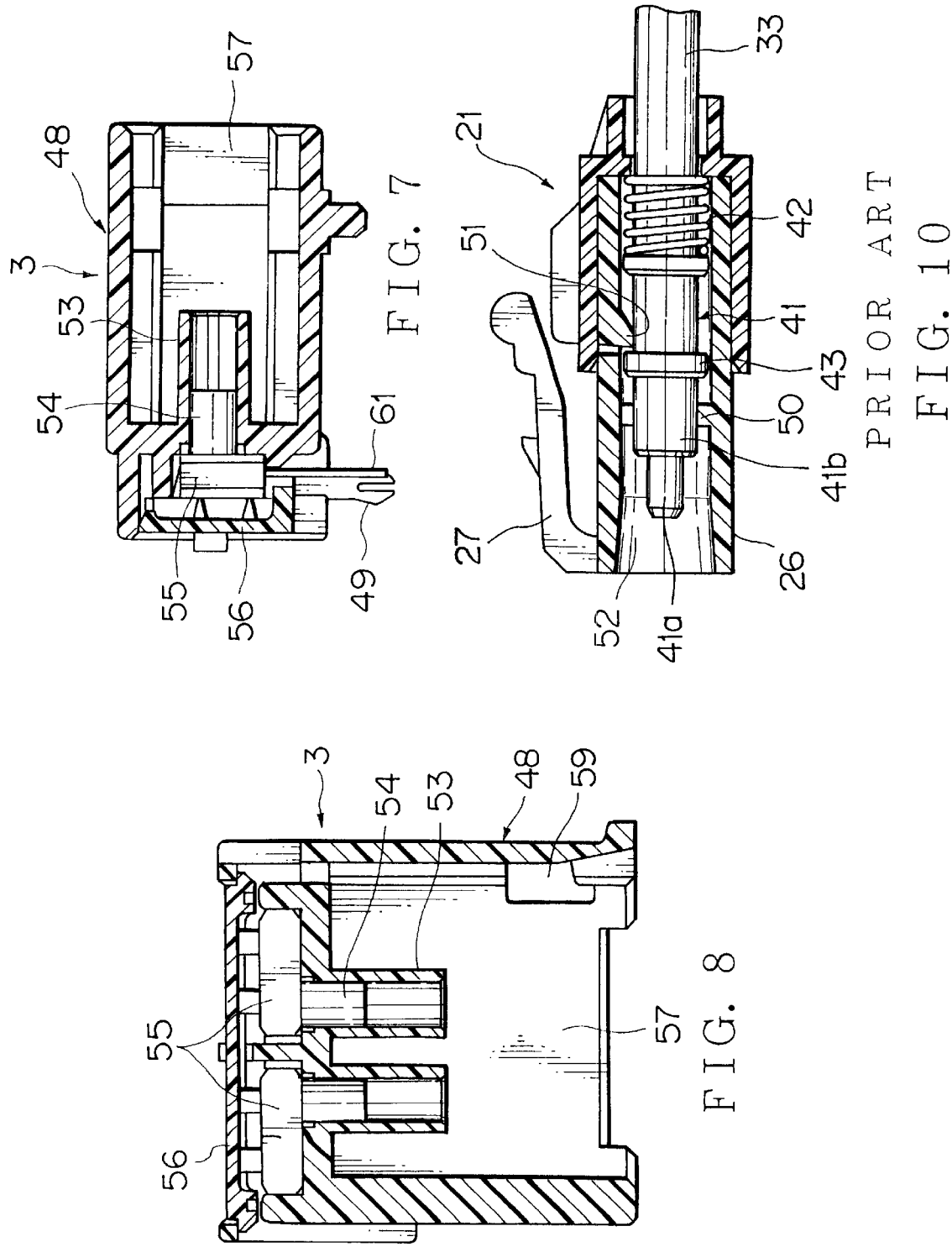

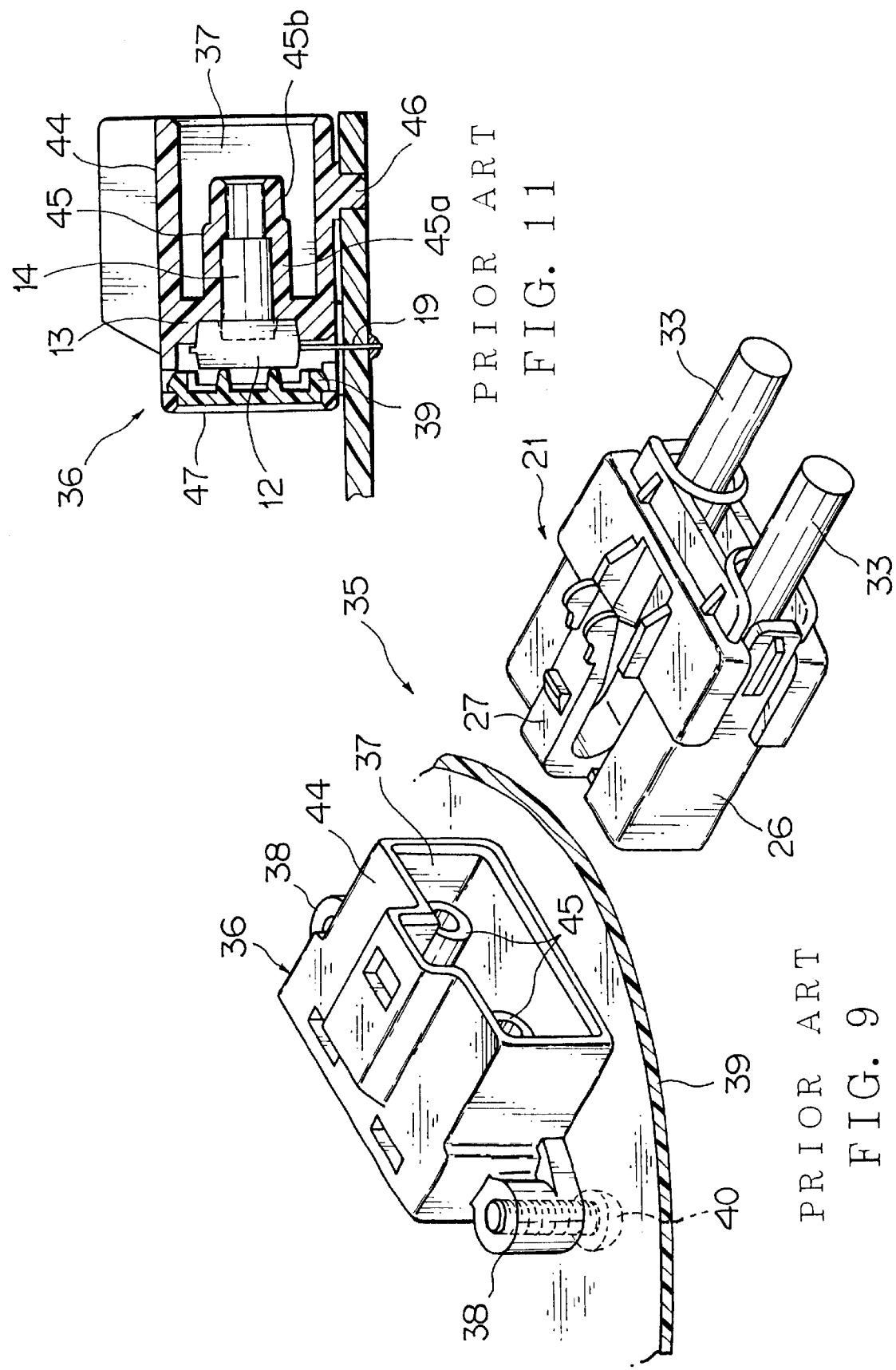

OPTICAL CONNECTOR

BACKGROUND OF THE INVENTION

1. Field of the Invention

The present invention relates to an optical connector to be used in an automobile or the like, and more particularly to the optical connector of a male type which includes a ferrule for an optical fiber cable mounted inside an annular wall of a housing, and aims to enhance rigidity of the housing while protecting the annular wall.

2. Description of the Related Art

Heretofore, for connection of auxiliary equipments in the automobile, there has been employed a wire harness which is an assembly of electric wires. However, it has been a problem that the wire harness has recently grown bulky and heavy with an increase in number of the auxiliary equipments and circuits therefor. In order to solve this problem, means for transmitting signals to the auxiliary equipments by means of optical fiber cables are employed in a part of the wire harness.

FIG. 9 shows one example of a conventional optical connector.

An optical connector 35 is composed of a male type optical connector (optical plug) 21 and a female type optical connector (receptacle) 36. The male type optical connector 21 is inserted in an engaging chamber 37 of the female type optical connector 36, and locked by a lock arm 27. The female type optical connector 36 is fixed to a circuit board 39 by means of bolts 40 at fixation parts 38 on both sides.

As also shown in FIG. 10, the male type optical connector 21 has ferrules 41 connected to optical fiber cables 33 or having the optical fiber cables 33 passed therethrough, in a male type housing 26 made of synthetic resin. The ferrules 41 are supported by receiving parts 50 which are integral with the housing 26, and biased forward (in an engaging direction of the connector) by means of a helical spring 42 to move back and forth to an extent where an intermediate flange 43 comes in contact with the receiving parts 50 and locking projections 51. Distal ends of the ferrules 41 respectively project into engaging chambers 52 in the housing 26.

As also shown in FIG. 11, the female type connector 36 has a female type housing 44 made of electrically conductive synthetic resin, and receiving trunks 45 in a cylindrical shape for the above mentioned ferrules 41 are integrally formed inside the housing 44. The receiving trunks 45 integrally project from a vertical partition wall 13 which defines the engaging chamber 37 of the housing 44. The housing 44 is fixed in contact with an earth circuit (not shown) of the circuit board 39 by means of the fixation parts 38 (See FIG. 9) on both sides in its backward half and by means of positioning pins 46 or so in its forward half.

A sleeve 14 is inserted into a large diametered portion 45a of each of the receiving trunks 45 in its backward part. The sleeve 14 is composed of a wave guide passage (not shown) in the center formed of glass or synthetic resin and a cylindrical holder formed of metal. Inside the housing 44, light converting elements (photo electric elements) 12 are arranged behind and adjacent to the receiving trunks 45. The sleeves 14 are in contact with the light converting elements 12. The light converting elements 12 are connected to the circuit board 39 by means of lead terminals 19 and pressed from the back by a cover 47 toward the receiving trunks 45.

The light converting elements 12 include a light emitting element such as a light emitting diode and a light receiving element (photo detector) such as a photodiode which are arranged in parallel to each other correspondingly to the two optical fiber cables 33 of the male type optical connector 35.

In FIG. 9, when the male type optical connector 35 is inserted into the engaging chamber 37 of the female type optical connector 36, small diametered portions 41a at forward ends of the ferrules 41 in FIG. 10 are inserted into small diametered portions 45b at forward ends of the receiving trunks 45 in FIG. 11, and the large diametered portions 45a in the backward half of the receiving trunks 45 enter along inner wall faces of the engaging chambers 52 of the housing 26. On this occasion, distal ends of the small diametered portions 41a of the ferrules 41 come in contact with distal ends of the sleeves 14 to connect respective wave guide passages (not shown) in the centers of the ferrules 41 and the sleeves 14.

One of the light converting elements 12, that is, the light emitting element 12 converts an electric signal from the circuit board 39 to an optical signal and transmits it to one of the optical fiber cables 33 (See FIG. 9), while the other light converting element 12, that is, the light receiving element 12 converts an optical signal from the other optical fiber cable 33 to an electric signal and transmits it to the circuit board 39.

In an optical connector of a type in which the sleeves 14 are not provided (not shown), the ferrules 41 inserted into the receiving trunks 45 directly contact the light converting elements 12. In some other cases, the distal ends 41a of the ferrules 41 are exposed to the exterior from the housing 26.

However, in the conventional optical connector, it has been difficult to stably support the ferrules inside the housing of the male type optical connector 21 without a backlash. Moreover, there has been such an anxiety that because an outer shape of the housing 26 is rectangular as shown in FIG. 9, while an inner shape of the engaging chambers 52 is circular to conform to a shape of the receiving trunks 45, and so, local difference in wall thickness of the housing is large, the inner shape of the engaging chambers 52 tends to be deformed into an oval shape out of a perfect circle, due to molding sink or distortion at high temperature when molding synthetic resin.

In such cases, when the male and female type optical connectors 21 and 36 are engaged with each other, respective centers of the receiving trunks 45 and the engaging chambers 52 may become offset, resulting in offsets between respective centers of the sleeves 14 in the receiving trunks 45 and the ferrules 41 in the engaging chambers 52, or offsets between respective centers of the ferrules 41 and the light converting elements 12 (in case where the sleeves 14 are omitted). Thus, there occurs such an anxiety that reliable connections of the optical fiber cables 33 (optical connection) may not be conducted.

In view of the above described circumstances, an object of the invention is to provide an optical connector in which deformation of the engaging chambers in the male type optical connector is prevented, ensuring accurate centering of the ferrules in the engaging chambers, and at the same time, accuracy of the centering of the ferrules can be maintained favorably at any time, even though an outer force is exerted to the male type optical connector or a distorting force or so is applied during engagement of the male and female type optical connectors.

SUMMARY OF THE INVENTION

In order to attain the above described object, there is provided, according to a first aspect of the present invention, an optical connector comprising a housing, at least one annular wall provided in the housing and exposed to the exterior, a ferrule for an optical fiber cable being adapted to be inserted into the annular wall, and a protective frame wall provided around the housing so as to project higher than the annular wall.

According to a second aspect of the invention, the frame wall is so arranged as to surround the annular wall.

According to a third aspect of the invention, the frame wall is projected upwardly and downwardly from both top and bottom sides of the housing.

According to a fourth aspect of the invention, a wall for mounting a ferrule locking member is formed integrally with the annular wall, the wall being positioned at the same height as the frame wall and continued from the frame wall.

According to a fifth aspect of the invention, a pair of the annular walls are arranged in parallel in proximity to each other.

According to a sixth aspect of the invention, a receiving trunk in a mating housing continued to a light converting element is adapted to be inserted into the annular wall, and the ferrule is adapted to be inserted into the receiving trunk.

According to the first aspect of the invention, because the annular wall in the housing for receiving the ferrule for the optical fiber cable is protected by the frame wall, even when the annular wall is trampled by foot, or interferes with the exterior during transportation, etc., or a strong prying force is applied when the optical connectors are engaged, the frame wall will bear the outer force and prevent the annular wall from the interference with the exterior. Thus, the annular wall will be prevented from deformation, enabling accurate centering of the ferrule with respect to the mating connector to be always performed, and ensuring a favorable optical connection at any time.

Moreover, because rigidity of the housing will be enhanced owing to the presence of the frame wall, there will be no molding sink, distortion nor deformation of the annular wall, when the housing is molded from synthetic resin or even though the housing is left at high temperature, attaining the same effects as described above. Because the molding sink, distortion and deformation of the annular wall are avoided, wall thickness of the annular wall can be made constant with high accuracy, and the centering of the ferrule can be conducted accurately. Further, by employing the exposed annular wall, the housing can be made compact in a vertical direction.

According to the second and the third aspects of the invention, because the annular wall is completely surrounded by the frame wall, the annular wall can be more reliably protected, and deformation of the annular wall can be more reliably prevented.

According to the fourth aspect of the invention, because the wall for mounting the ferrule locking member constitutes a part of the frame wall, the annular wall can be protected from a stronger outer force than in a case where the frame wall only is provided.

According to the fifth aspect of the invention, because the pair of the annular walls are arranged in proximity to each other, rigidity and strength of the annular walls are increased, to promote protectivity of the frame wall with respect to the annular walls, and at the same time, the housing can be made compact in a lateral direction.

According to the sixth aspect of the invention, the receiving trunk in the mating housing can be smoothly introduced into the annular wall which is free from distortion and deformation, improving engaging ability between the connectors. At the same time, the ferrule can be smoothly introduced into the receiving trunk without misalignment, and reliability of the optical connection between the optical fiber cable and the light converting element can be improved.

BRIEF DESCRIPTION OF THE DRAWINGS

FIG. 7 is a longitudinal sectional view of a female type optical connector;

FIG. 8 is a horizontal sectional view of the female type optical connector;

FIG. 9 is an exploded perspective view showing an example of a conventional optical connector;

FIG. 10 is a longitudinal sectional view of a male type optical connector of FIG. 9; and FIG. 11 is a longitudinal sectional view of a female type optical connector of the same.

DESCRIPTION OF THE PREFERRED EMBODIMENT

Figure 1:
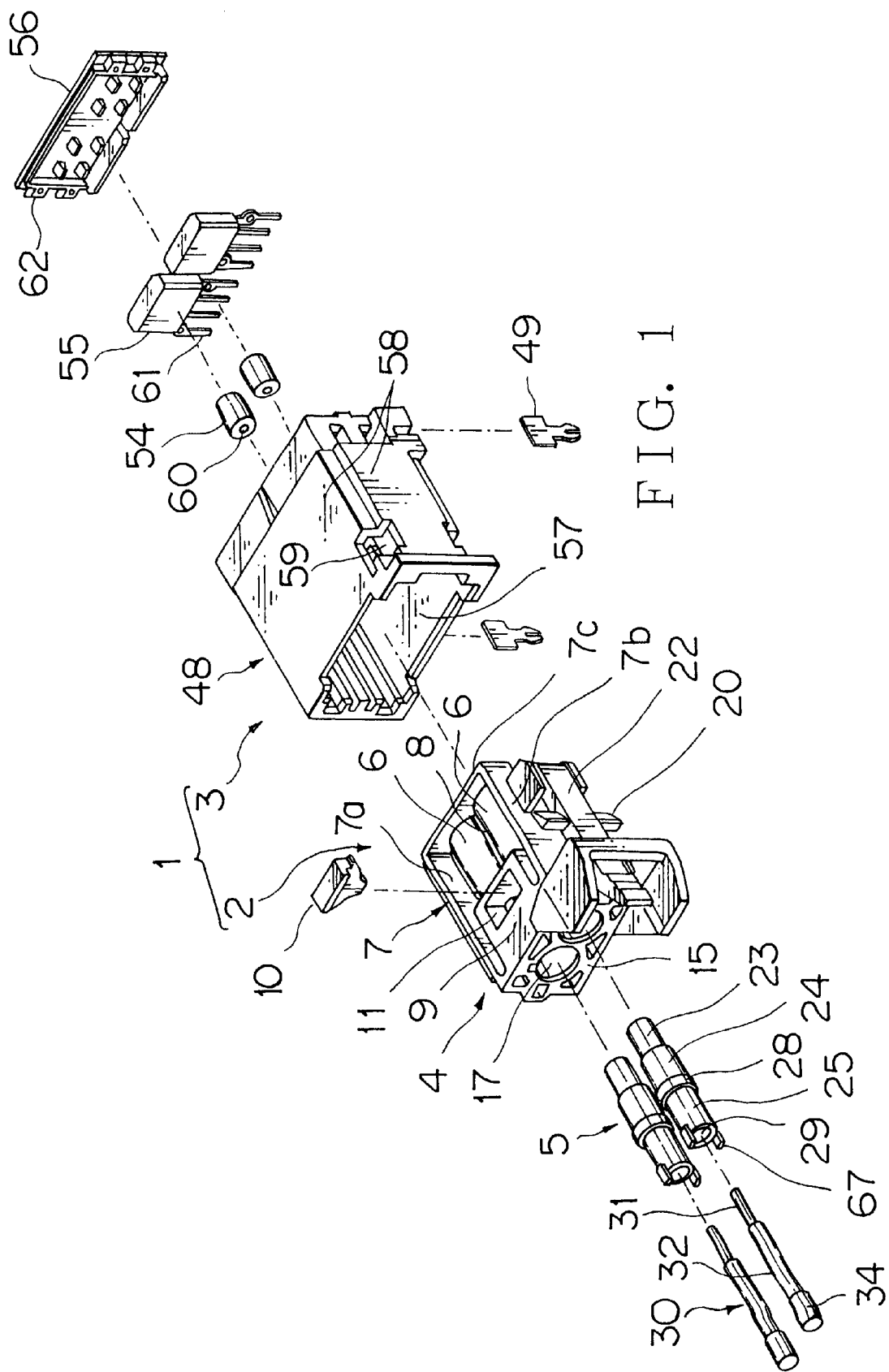
FIG. 1 is an exploded perspective view showing one embodiment of an optical connector according to the present invention.

Now, an embodiment according to the present invention will be described in detail referring to the drawings.

FIG. 1 shows one embodiment of an optical connector according to the invention which is composed of a male type optical connector and a female type optical connector to be mated together.

An optical connector 1 is composed of a male type optical connector 2 and a female type optical connector 3. A pair of annular walls 6 for receiving ferrules 5 are arranged in parallel in a housing 4 of the male type optical connector 2 made of synthetic resin. A protective frame wall 7 is integrally formed at an outer circumference of the housing 4 so as to project higher than the annular walls 6.

The pair of the annular walls 6 are continued or connected at an intermediate partition 8 between them, and continued to inner side faces of the protective frame wall 7 at both sides. The protective frame wall 7 is protruded upward and downward of the housing 4 as described below. On an upper side of the housing 4, the annular walls 6 have a length longer than a half of the total length of the housing 4, and a backward half of the housing is covered with a top wall 9 in a shape of a rectangular block having a same height as the frame wall 7.

The top wall 9 is provided with an insertion hole 11 for receiving a locking member 10 which is adapted to lock the ferrules 5 (ferrule locking member). A back wall 12 of the housing 4 is provided with a pair of ferrule insertion bores 17 which are respectively continued to engaging chambers 16 (See FIG. 4) inside the annular walls 6. A side wall 18 is provided with a flexible lock arm 22 having a locking projection 20 for locking the female type optical connector 3.

Each of the ferrules 5 has a small diametered portion 23 at its forward part, a large diametered portion 24 at its intermediate part, and a middle diametered portion 25 at its backward part, a flange 28 between the large diametered portion 24 and the middle diametered portion 25, and a flange piece 67 at a backward end. An insertion bore 29 for an optical fiber cable 30 is formed in a longitudinal direction inside the ferrule 5. The optical fiber cable 30 has a wave guide passage 31 exposed at its forward part, a small diametered first sheath 32 continued therefrom and covering the wave guide passage 31, and a large diametered second sheath 34.

The male type optical connector 2 is composed of the male type housing 4, the locking member 10, the pair of the ferrules 5, and terminal ends of the two optical fiber cables 30. The male type optical connector 2 is covered with a dust free case (not shown) made of synthetic resin to be protected in transporting and storing stages before engagement of the connectors.

The female type optical connector 3 to be mated is composed of a housing (mating housing) 48 made of electrically conductive synthetic resin, a pair of earth terminals 49 which are pressure inserted into a bottom wall of the housing 48, a pair of sleeves 54 as light guiding members which are inserted into receiving trunks 53 (See FIG. 7) inside the housing 48 from a back wall of the housing, a pair of light converting elements 55 mounted to a back end of the housing 48, and a cap 56 made of synthetic resin for pressure fixing the light converting elements 55 to the housing 48.

The housing 48 has an engaging chamber 57 for receiving the male type optical connector 2. Into the engaging chamber 57, the male type housing 4 including the lock arm 22 is adapted to be inserted. A wall 58 of the engaging chamber 57 is provided with a locking hole 59 to be engaged with the locking projection 20 of the lock arm 22.

Each of the sleeves 54 has a wave guide passage 60 in its center. The light converting elements 55 have lead terminals 61 respectively, which are connected to a circuit board (not shown) with the earth terminal 49. The cap 56 has a lock portion 62 for the housing 48. The female type optical connector 3 is covered with a dust free case (not shown) made of synthetic resin to be protected in the transporting and storing stages before the engagement of the connectors.

The male type optical connector 2 will be described below in detail, referring to FIGS. 2 to 6.

Figure 2:
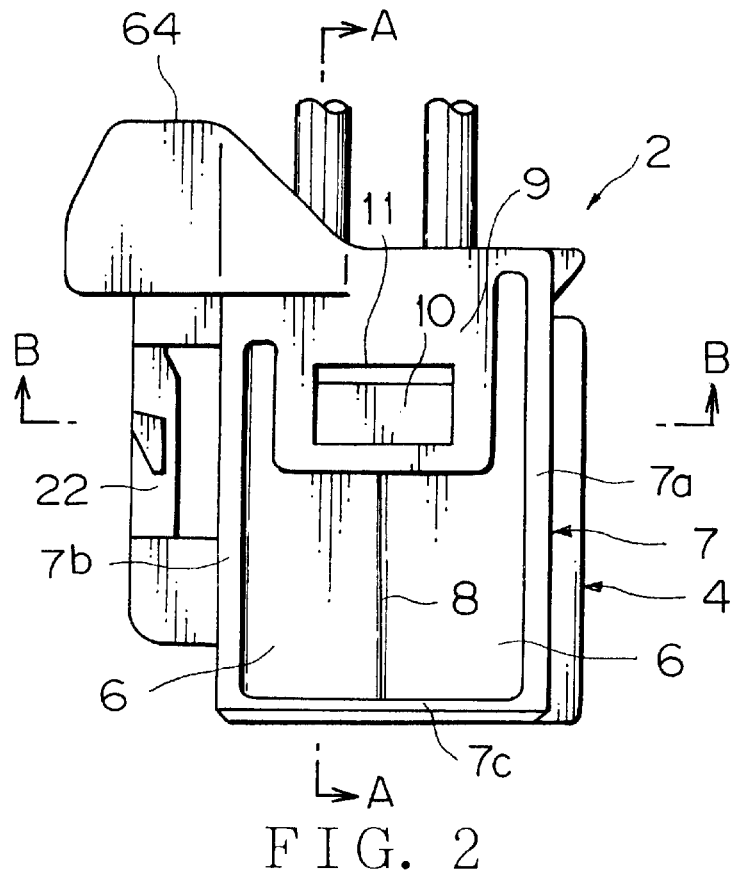
FIG. 2 is a plan view of a male type optical connector.
Figure 3:
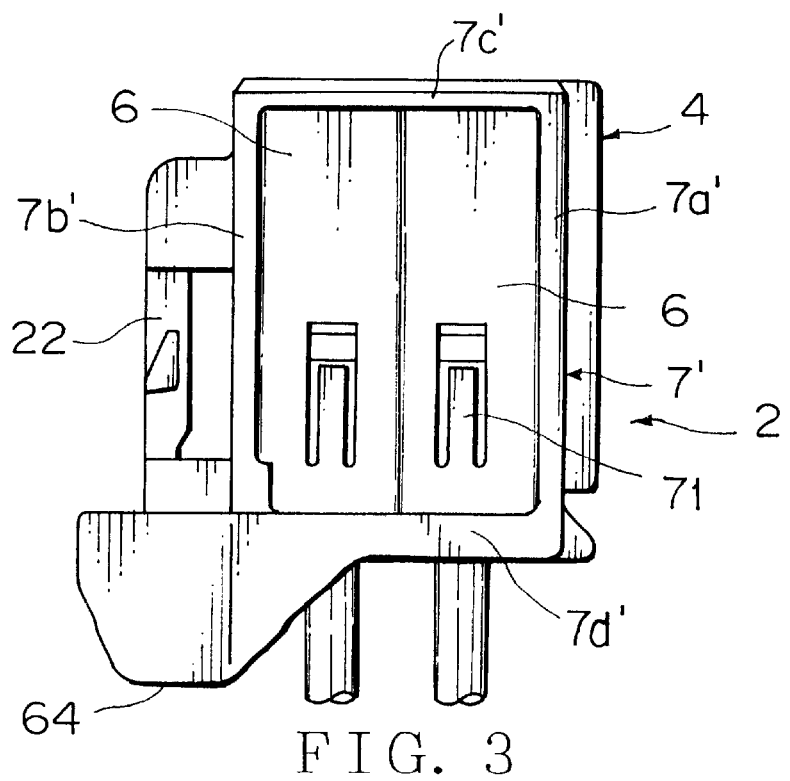
FIG. 3 is a bottom view of the male type optical connector.
Figure 4:
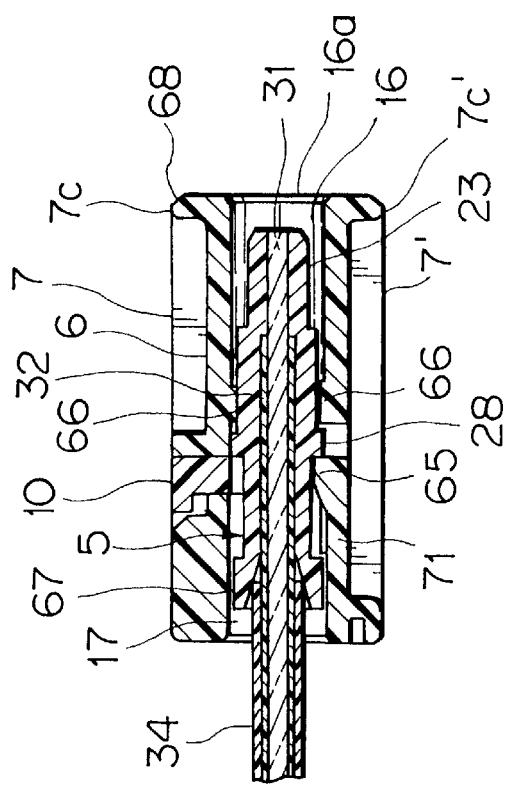
FIG. 4 is a sectional view of the male type optical connector taken along a line A—A of FIG. 2.
Figure 6:
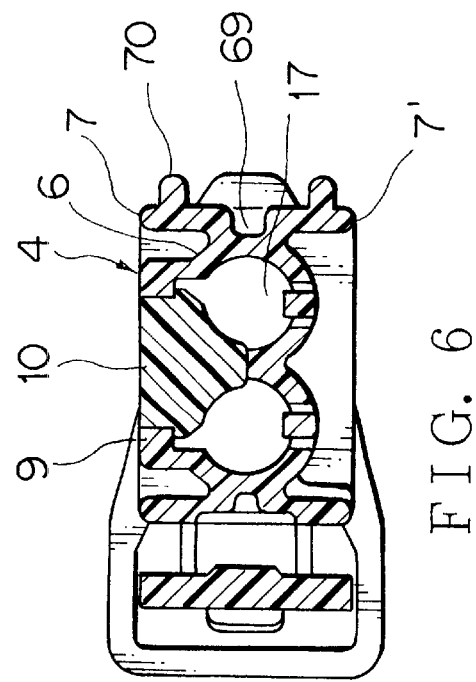
FIG. 6 is a sectional view of the male type optical connector taken along a line B—B of FIG. 2.
Figure 5:
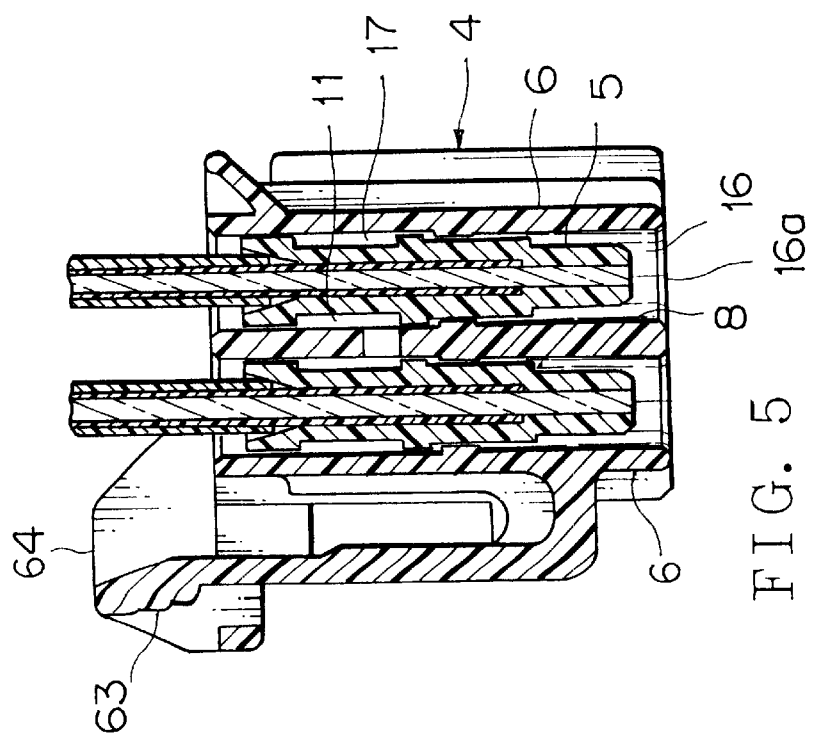
FIG. 5 is a horizontal sectional view of the male type optical connector.

FIG. 2 is a plan view showing the male type optical connector 2, FIG. 3 is a bottom view of the same, FIG. 4 is a sectional view taken along a line A—A of FIG. 2, FIG. 5 is a horizontal sectional view of FIG. 2, and FIG. 6 is a sectional view taken along a line B—B of FIG. 2.

In order to protect the pair of the annular walls 6 which contain the ferrules 5 (See FIG. 5), a frame wall 7 in a C-shape is formed around the annular walls 6 except the backward end thereof, as shown in FIG. 2. A frame wall portion 7a at one side extends up to the backward end of the housing 4, and a frame wall portion 7b at the other side extends up to a protective wall 64 for an operating section 63 (See FIG. 5) of the lock arm 22. Both the frame portions 7a and 7b are integrally connected by means of a frame wall portion 7c at the forward end.

The flat top wall 9 extends from the backward end of the housing 4 up to a longitudinally middle part of the housing 4. Back ends of the pair of the annular walls 6 are protected by the top wall 9 which has the same height as the frame wall 7. The top wall 9 may be considered as a part of the frame wall 7. The ferrule locking member 10 is inserted into the rectangular hole 11 which is formed in the top wall 9. In this manner, the pair of the annular walls 6 are completely surrounded and protected by the C-shaped frame wall 7 and the top wall 9.

Because the frame wall 7 and the top wall 9 are higher than the annular walls 6, even when the optical connector 2 has received such an outer force as being trampled by foot, or dropped during transportation, the frame wall 7 and the top wall 9 will bear the outer force or so, and protect the annular walls 6 which are relatively thin and constant in wall thickness, from interference with the exterior.

Moreover, even in case where a strong prying force is applied when the male and the female type optical connectors 2, 3 are engaged, the annular walls 6 will not be deformed nor distorted due to rigidity of the housing 4 itself in terms of bending strength, buckling strength, tensile strength, torsional strength, etc. which has been enhanced by the frame wall 7.

Because the annular walls 6 are thus protected from the interference with the exterior and the distortion, center positions of the ferrules 5 in FIGS. 4 and 5 will be always maintained accurately, and at the same time, the receiving trunks 53 of the female type optical connector 3 (See FIGS. 7 and 8) can be accurately inserted without misalignment into the engaging chambers 16 in the annular walls 6 through forward openings 16a. With this arrangement, the centers of the ferrules 5 and the sleeves 54 in the receiving trunks 53 will be always accurately aligned, enabling an exact optical connection to be performed. In case where the sleeves 54 are not employed, the ferrules 5 are precisely centered with respect to the optical converting elements 55, thus enabling the exact optical connection to be performed.

A protective frame wall 7' is also formed at a bottom side of the housing 4, as shown in FIG. 3. The pair of the annular walls 6 extend in straight lines at the bottom side of the housing 4 from the forward end to the backward end of the housing 4. Each of the annular walls 6 has a substantially circular shape in cross section.

In FIG. 3, the pair of the annular walls 6 are completely exposed at the bottom side of the housing 4 along their entire length, as they are so at the top side as shown in FIG. 2. Since there is provided no wall on surfaces of the annular walls 6, the structure will be simplified and made compact. Moreover, because molding sinks will be prevented when molding synthetic resin, assuring excellent moldability of the annular walls 6, wall thickness of the annular wall 6 will be made constant without local differences.

As the results, the ferrules 5 in FIGS. 4 and 5 are inserted from the back into the insertion bores 17 which are inner spaces in the annular walls 6 with high positioning accuracy. At the same time, the receiving trunks 53 of the mating connector in FIGS. 7 and 8 are inserted into the engaging chambers 16 through the forward openings 16a along the inner faces of the annular walls 6 with high positioning accuracy. Thus, the centers of the ferrules 5 and the sleeves 54 in the receiving trunks 53, or the ferrules 5 and the optical converting elements 55 will be always accurately aligned, enabling an exact optical connection to be performed. In addition, because the pair of the annular walls 6 are arranged in proximity to each other, arrangements of the ferrules 5 and so on can be made small-pitched, and the housing 4 can be made compact in a lateral direction.

In FIG. 3, the protective frame wall 7' is formed in a substantially rectangular shape along the both sides and the forward and the backward ends of the pair of the annular walls 6. Thus, the pair of the annular walls 6 are completely surrounded and protected by the substantially rectangular frame wall 7'. The frame wall 7' is higher than the annular walls 6. The frame wall 7' has the same height and the same effect as the frame wall 7 at the top side.

In FIG. 3, the both sides of the pair of the annular walls 6 are integrally continued to the inner faces of the frame wall portions 7a', 7b' at both sides, the forward ends of the annular walls 6 are integrally continued to the inner face of the frame wall portion 7c', and the backward ends of the annular walls 6 are integrally continued to the inner face of the frame wall portion 7d'. This frame wall portion 7d' at the backward side is integrally continued to the protective wall 64 for the lock arm 22.

In backward half areas of the annular walls 6, there are provided narrow flexible lock arms 71 for locking the ferrules, in a longitudinal direction of the annular walls 6. Each of the lock arms 71 has an inwardly directed projection 65 as shown in FIG. 4, which is engaged with a backward end of the flange 28 formed at a longitudinally middle part of the ferrule 5. The backward end of this flange 28 is also locked by the lock member 10 provided thereabove.

An outer peripheral face of each of the ferrules 5 is supported in contact with an annular protuberance 66 inside the annular wall 6 in front of the flange 28, and the flange piece 67 at the backward end is in contact with an inner peripheral face of the insertion bore 17. In this manner, the ferrule 5 can be stably supported at the two positions in the forward and backward parts, and can be accurately positioned. The optical fiber cable 30 is inserted into the ferrule 5 to position the wave guide passage 31 in the small diametered portion 23 at the forward end of the ferrule 5. The first sheath 32 is positioned behind the wave guide passage 31, and the second sheath 34 is positioned therebehind in contact with an inclined inner face of the flange piece 67. The frame wall portions 7c, 7c' at the forward end are provided with tapered faces 68 for guiding the connector when inserted.

As shown in FIG. 5, the pair of the annular walls 6 of the housing 4 are integrally connected by means of the common partition wall 8 between them. There are formed grooves 69 on both side faces of the pair of the annular walls 6 as shown in FIG. 6, and the frame walls 7 and 7' are continued from the groove 69 in upward and downward directions. Horizontally projecting ribs 70 are formed on outer side faces of the frame walls 7, 7' to increase rigidity of the frame walls 7, 7'. Numeral 11 in FIG. 5 designates the locking member insertion hole.

The locking member 10 is inserted into the pair of the ferrule insertion bores 17 at the intermediate part between the pair of the annular walls 6 as shown in FIG. 6. The top wall 9 and the upper frame wall 7 of the housing 4 are located at the same level, while the lower frame wall 7' protrudes upright above the top of the annular walls 6 by a size substantially equal to a radius of the ferrule insertion bore 17. The ferrule insertion bore 17 are coaxially continued in straight lines to the engaging chambers 16 in the forward end as shown in FIG. 4.

The female type optical connector 3 will be briefly described below, referring to FIGS. 7 and 8.

FIG. 7 is a longitudinal sectional view corresponding to FIG. 4, and FIG. 8 is a horizontal sectional view corresponding to FIG. 5. The relatively thin-walled receiving trunks 53 in a cylindrical shape are formed in a projecting manner inside the engaging chamber 57 of the female type housing 48 which is formed of electrically conductive synthetic resin. The sleeves 54 are inserted into the receiving trunks 53 so that the backward ends of the sleeves 54 are abutted against the light converting elements 55. The lead terminals 61 of the light converting elements 55 project downward along with the earth terminals 49 which are continued to the housing 48. The light converting elements 55 are retained at the backward end of the housing 48 by the cap 56 of synthetic resin.

The receiving trunks 53 are formed thin-walled having a constant wall thickness. By forming the receiving trunks 53 to have the thin-walls, the engaging chambers 16 in the annular walls 6 in FIGS. 4 and 5 can be made small, thus enabling the male type housing 4 to be made compact. There will occur no problem even though the receiving trunks have the thin-walls, because the annular walls 6 will be protected from the outer force after the receiving trunks have been inserted into the engaging chambers 16, and the outer force will not act on the receiving trunks 53.

The male type optical connector 2 is inserted into the engaging chamber 57 of the female type housing 48, and the lock arm 22 is also received in the housing 48. The projection 20 of the lock arm 22 (See FIG. 1) is engaged in the lock hole 59 of the housing 48. The small diametered portions 23 of the ferrules 5 are respectively inserted into the receiving trunks 53, and the optical fiber cables 30 are connected to the light converting elements 55 through the sleeves 54.

Although the present invention has been fully described by way of examples with reference to the accompanying drawings, it is to be noted that various changes and modifications can be made in a scope of the present invention.

What is claimed is:

1. An optical connector comprising;

a housing, at least one annular wall provided in said housing and exposed to the exterior, a ferrule for an optical fiber cable being adapted to be inserted into said annular wall, and a protective frame wall provided around said housing so as to project higher than said annular wall;

wherein a top wall for mounting a ferrule locking member is formed integrally with said annular wall, said top wall being positioned at the same height as said frame wall and continued from said frame wall.

2. The optical connector as claimed in claim 1, wherein said frame wall is so arranged as to surround said annular wall.

3. The optical connector as claimed in claim 1, wherein said frame wall is projected upwardly and downwardly from both top and bottom sides of said housing.

* * * * *